(12) United States Patent
Wynter et al.

(10) Patent No.: US 12,323,475 B2
(45) Date of Patent: Jun. 3, 2025

(54) FLEXIBLE ORCHESTRATION OF SESSION CONTENT IN VENUE NETWORKS

(71) Applicant: INTERNATIONAL BUSINESS MACHINES CORPORATION, Armonk, NY (US)

(72) Inventors: Laura Wynter, Singapore (SG); Nirmit V Desai, Yorktown Heights, NY (US); Mudhakar Srivatsa, White Plains, NY (US); Chaitanya Kumar, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/820,695

(22) Filed: Aug. 18, 2022

(65) Prior Publication Data

US 2024/0064183 A1 Feb. 22, 2024

(51) Int. Cl.
| | |
|---|---|
| *H04L 65/403* | (2022.01) |
| *H04L 43/0876* | (2022.01) |
| *H04L 47/12* | (2022.01) |
| *H04L 65/1069* | (2022.01) |

(52) U.S. Cl.
CPC ........ *H04L 65/403* (2013.01); *H04L 43/0876* (2013.01); *H04L 47/12* (2013.01); *H04L 65/1069* (2013.01)

(58) Field of Classification Search
CPC ... H04L 65/403; H04L 43/0876; H04L 47/12; H04L 65/1069
USPC ....................................................... 709/204
See application file for complete search history.

(56) References Cited

U.S. PATENT DOCUMENTS

| | | |
|---|---|---|
| 8,978,055 B1 | 3/2015 | Sudo et al. |
| 10,382,903 B2 | 8/2019 | Shaw |
| 10,694,291 B2 | 6/2020 | Zhang |
| 10,701,681 B1 | 6/2020 | Tofighbakhsh |
| 10,965,544 B2 | 3/2021 | Embarmannar Vijayan |
| 11,252,655 B1 | 2/2022 | Gupta |

(Continued)

OTHER PUBLICATIONS

Author Unknown, "Huawei CloudLink Edge 1000 Integrated Video Conferencing Solution", https://e.huawei.com/sg/products/cloud-communications/telepresence-video-conferencing/infrastructure/cloudInk-edge-1000, Huawei Technologies Co., Ltd, Accessed Apr. 4, 2022, pp. 1-3.

(Continued)

*Primary Examiner* — Ario Etienne
*Assistant Examiner* — Kidest Mendaye
(74) *Attorney, Agent, or Firm* — Kristofer Haggerty (57) ABSTRACT

A computer-implemented method, a computer system and a computer program product route meeting sessions through a venue based on device availability. The method includes identifying a plurality of sessions in a venue network, where each session in the plurality of sessions comprises session data that is associated with a network slice. The network slice includes connection requirements. The method also includes receiving a connection request from a user, where the connection request includes a session in the plurality of sessions. The method further includes determining an available device to receive the session data, where the available device satisfies the connection requirements of the network slice. Lastly, the method includes associating the available device with the network slice, where the session data is transmitted to the available device.

20 Claims, 2 Drawing Sheets

(56) References Cited

U.S. PATENT DOCUMENTS

| | | | | |
|---|---|---|---|---|
| 11,310,733 | B1* | 4/2022 | Gupta | H04W 24/02 |
| 2010/0130241 | A1* | 5/2010 | Kitaji | H04W 28/18 |
| | | | | 455/509 |
| 2012/0254458 | A1 | 10/2012 | Langille | |
| 2014/0106721 | A1* | 4/2014 | Calman | H04L 12/1818 |
| | | | | 455/416 |
| 2016/0077710 | A1 | 3/2016 | Lewis et al. | |
| 2017/0195893 | A1 | 7/2017 | Lee et al. | |
| 2020/0366567 | A1* | 11/2020 | Li | H04L 41/5003 |
| 2021/0211479 | A1* | 7/2021 | Trim | H04L 65/61 |
| 2021/0282082 | A1* | 9/2021 | Mildh | H04W 76/11 |
| 2021/0368379 | A1* | 11/2021 | Xing | H04W 72/0453 |
| 2022/0022000 | A1 | 1/2022 | Bruhn | |
| 2022/0022044 | A1 | 1/2022 | D'Oro | |
| 2022/0101556 | A1 | 3/2022 | Zhang et al. | |
| 2022/0141762 | A1* | 5/2022 | Kalra | H04W 48/18 |
| | | | | 370/329 |
| 2023/0370887 | A1 | 11/2023 | Parker et al. | |
| 2023/0379763 | A1* | 11/2023 | Soryal | H04W 28/24 |

OTHER PUBLICATIONS

Author Unknown, "SMC Video Conferencing Service Management System", https://e.huawei.com/sg/products/cloud-communications/telepresence-video-conferencing/infrastructure/smc3, Huawei Technologies Co., Ltd, Accessed Apr. 4, 2022, pp. 1-3.

Author Unknown, "What is the Maximum Number of Participants in a Webex Session or Call?", https://help.webex.com/en-us/article/WBX26731/What-is-the-Maximum-Number-of-Participants-in-a-Webex-Session-or-Call?, Cisco and/or its affiliates, Feb. 18, 2022, pp. 1-6.

Author Unknown, "X2O OneRoomTM Meeting Room", https://www.x2omedia.com/en/solutions/oneroom/meeting-room/, X2O Media Solutions, Accessed Mar. 19, 2022, pp. 1-6.

Author Unknown. "Hybrid Events", https://floor.bz/hybrid-events/, Hybrid Events Solution, Floor, Accessed on Mar. 19, 2022, pp. 1-12.

Boros et al., "Enabling Superior and Controllable Video Streaming QoE with 5G Network Orchestration", https://ieeexplore.ieee.org/document/8685911, IEEE, ICIN 2019: 3rd International Workshop on Quality of Experience Management, Accessed Jul. 6, 2022, pp. 124-129.

Bruschi et al., "Managing 5G network slicing and edge computing with the MATILDA telecom layer platform", https://www.researchgate.net/publication/351045989, Article in Computer Networks, Apr. 2021, pp. 1-17.

Gharbaoui et al., "Implementation of an Intent Layer for SDN-enabled and QoS-Aware Network Slicing", https://ieeexplore.ieee.org/document/9492643, IEEE 7th International Conference on Network Softwarization (NetSoft), 2021, Accessed Jul. 8, 2022, pp. 17-23.

Krishnan et al., "SDN Enabled QoE and Security Framework for Multimedia Applications in 5G Networks", https://doi.org/10.1145/3377390, ACM Trans. Multimedia Comput. Commun.,Appl., vol. 17, No. 2, Article 39. Publication date: Apr. 2021, pp. 1-29.

Li et al., "Context-Aware Service Function Chaining and Its Cost-Effective Orchestration in Multi-Domain Networks", IEEE Access, Special Section on Survivability Strategies for Emerging Wireless Networks, https://ieeexplore.ieee.org/document/8387764, vol. 6, Jun. 18, 2018, pp. 34976-34991.

Salhab et al., "5G network slices resource orchestration using Machine Learning techniques", https://www.sciencedirect.com/science/article/pii/S1389128621000165, ScienceDirect, Journal of Computer Networks, Dec. 27, 2020, pp. 1-24.

Tas et al., "Personalized Media Streaming System", https://priorart.ip.com/IPCOM/000251338, IPCOM000251338D, Oct. 30, 2017, pp. 1-10.

Thiruvasagam et al., "Resilient and Latency-Aware Orchestration of Network Slices Using Multi-Connectivity in MEC-Enabled 5G Networks", https://ieeexplore.ieee.org/document/9461155, IEEE, Transactions on network and service management, vol. 18, No. 3, Sep. 2021, pp. 2502-2514.

"IBM: List of IBM Patents or Patent Applications Treated as Related. Filed Herewith. 2 pages."

Wynter, et al., "Directional Content Delivery Through Slicing of Wireless Spectrum", U.S. Appl. No. 17/820,675, filed Aug. 18, 2022, 28 pages.

* cited by examiner

FLEXIBLE ORCHESTRATION OF SESSION CONTENT IN VENUE NETWORKS

BACKGROUND

Embodiments relate generally to the field of orchestrating meeting session content delivery over telecommunications networks and more specifically, to routing meeting session content in a venue to available devices on demand.

Large conferences and other meetings may offer multiple sessions that may combine, in each session, pre-recorded videos, chat sessions, and live video streams with accompanying audio or text, and in-person content. These multiple sessions may be managed by a service using the venue network infrastructure through active management/orchestration and control of the venue network. Such a service may be accessible remotely over the Internet using an Internet-enabled application such as a browser on a computer or mobile device or a monitor and speakers or other equipment that may be available within the conference venue or in any establishment that may be accessible to a user. Several sessions of the conference may occur simultaneously, and a user may select from a schedule of available sessions to view and potentially participate. The conference venue network may route selected sessions to available devices that may be equipped appropriately using proper network orchestration.

In some cases, such as for remote participation in a large conference or meeting, the physical environment of the venue may be a large open space that may require configuration to allow multiple sessions to be attended simultaneously without interference.

SUMMARY

An embodiment is directed to a computer-implemented method for routing meeting session content in a venue based on device availability. The method may include identifying a plurality of sessions to be attended at the venue, along with an estimated or measured number of attendees for each session. Each session in the plurality of sessions comprises session data that may be associated with a network slice, where the network slice may include connection requirements. The method may also include receiving a connection request to participate in a session from a user, where the connection request may include a session in the plurality of sessions. The method may further include determining an available device to receive the session data, where the available device satisfies the connection requirements of the network slice. Lastly, the method may include associating the available device with the network slice, wherein the session data is transmitted to the available device.

In another embodiment, the method may include transmitting a notification response to the user indicating the available device.

In a further embodiment, the method may include monitoring session bandwidth of the session data being transmitted to the available device and network slice bandwidth, identifying an event during the session that increases a consumption level of the network slice above a consumption threshold, where the consumption level is a ratio of the session bandwidth to the network slice bandwidth, and adjusting the network slice bandwidth such that the consumption level of the network slice is below the consumption threshold during the event.

In yet another embodiment, the determining the available device to receive the session data may include determining the number of users at each location based on the connection requests, selecting a spectrum zone in the venue network based on the user's location and the connection requirements of the network slice, and identifying a device in a selected spectrum zone, where the device is not associated with any network slice and satisfies the connection requirements of the network slice.

In another embodiment, a machine learning model that predicts a bandwidth impact to a network connection by adding a device to the network connection is used to determine the available device.

In a further embodiment, the session data may be selected from a group consisting of: audio data, video data, text data, and images that are generated during the session.

In yet another embodiment, the connection requirements of the network slice may be selected from a group consisting of: a number of users, a number of connected devices, an available range of the network slice bandwidth, device types, and physical restrictions on network elements.

In yet another embodiment, a large open space may be subdivided into multiple spectrum zones, where directional antennae may be placed and oriented such that different signals cover different portions of the space, allowing for simultaneous use of audio and video in different locations within the space without interference.

In addition to a computer-implemented method, additional embodiments are directed to a system and a computer program product for routing meeting session content in a venue based on device availability.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

It may be common for large groups of users to gather for conferences or other large meetings in a pre-defined venue that may be held over multiple days with multiple sessions running in parallel. As the popularity of connecting to conferences or other large meetings remotely through the Internet increases, venue network infrastructure may be tasked with connecting both local and remote users to the wide array of sessions that may be scheduled for the conference. In addition, each session may be made up of various types of content, such as live, in-person, audio and video of a speaker, pre-recorded video and audio elements, as well as text elements and images including presentations on a computer screen or other presentation device. Local users may be directed to the source of the broadcast of the session or to a different local area that may have the session routed through the local venue network, for example in the case of insufficient space at the source location of the session broadcast, while remote users may look at a schedule on a web browser or some other online method, and select a session to attend, then connect to the session over the Internet.

However, while remote sessions may be attended by users in any location on demand, it may be difficult for users to navigate the content and schedule that may be provided by venues and this may render such systems cumbersome for remote attendees of conferences with multiple tracks occurring at the same time. For example, a user may need to manually control and manage the technical aspects of connecting to the venue network while simultaneously trying to focus on the content of the conference. Another possible problem may be a limitation on the bandwidth to the user's device or the number of different sessions that the user's device may be able to host. In addition, the ambiance of a conference or other meeting may be lost from the user's perspective without the presence of other users in a room that may also be connected to the session. From the venue network controller perspective, many different users in disparate locations may request access to a single session and it may be onerous for the venue network controller to establish and maintain a large number of connections to a single session on a device-by-device basis.

It may be useful to provide an automated method or system for the venue network to create a hybrid virtual-physical event by orchestrating a connection from the session to a more limited number of devices through user requests for the session data, where a network slice may be created or modified to allow the session data to be sent to appropriate devices, such as a monitor and speakers that may be physically located in the conference venue, or at alternate sites such as a cafe, bars, school halls, gyms, offices or entertainment facilities such as cinemas, or perhaps a mobile device that may be operated by a user. Such a method or system may improve the responsiveness of venue network controllers to requests from users for connections to sessions, and to the network by extension, and also increase efficiency of data processing by connecting users to the sessions that they want to join and streamlining the connections such that the devices may be added to a network slice, rather than the need to maintain many connections to disparate devices in many locations.

Figure 1:
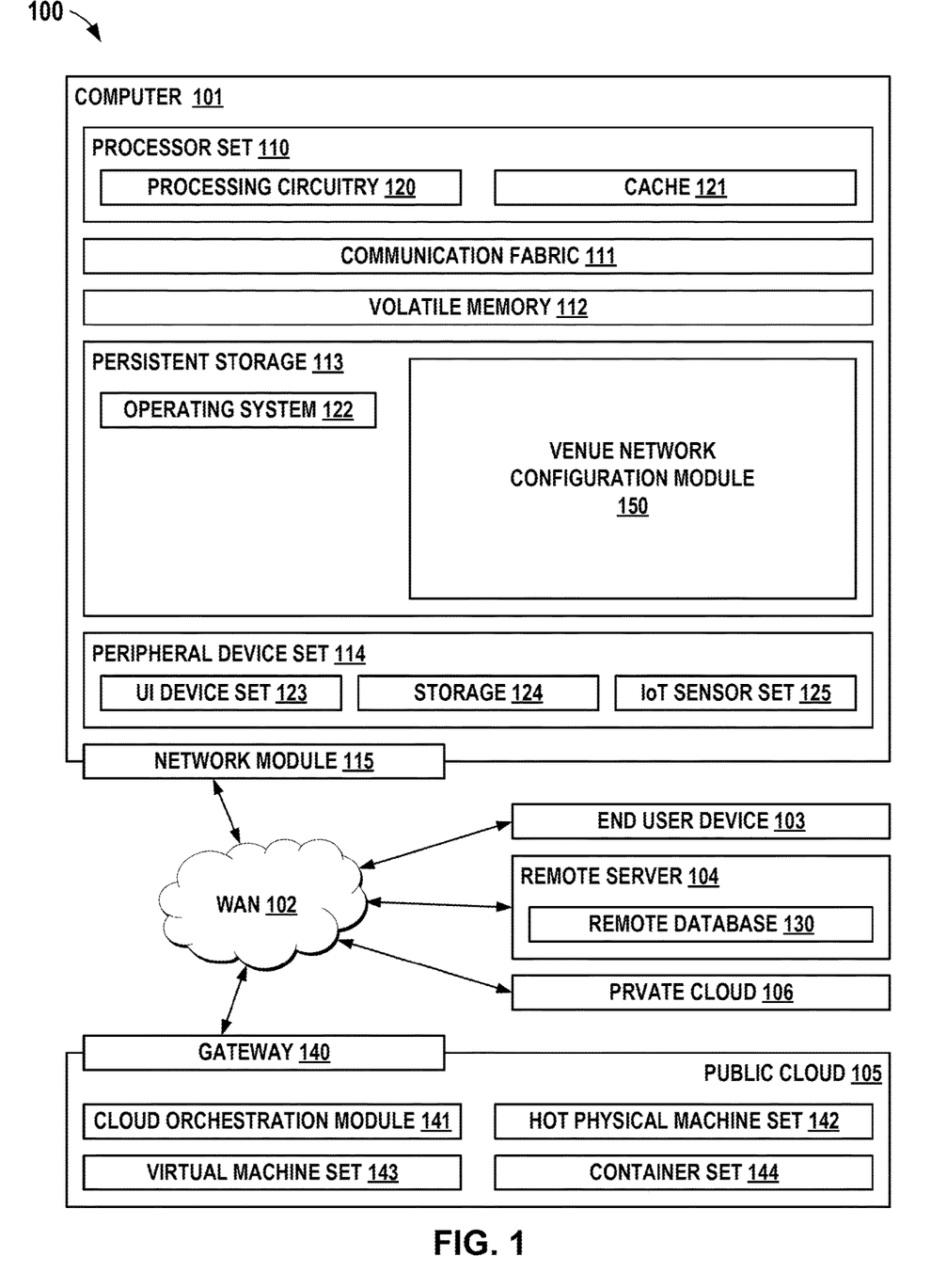
FIG. 1 depicts a block diagram of an example computer system in which various embodiments may be implemented.

Referring to FIG. 1, computing environment 100 contains an example of an environment for the execution of at least some of the computer code involved in performing the inventive methods, such as venue network configuration module 150. In addition to venue network configuration module 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and venue network configuration module 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in venue network configuration module 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in venue network configuration module 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of VCEs will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Computer environment 100 may be used to create a hybrid virtual-physical conference event by routing individual sessions in a venue network based on device availability. In particular, the venue network configuration module 150 may identify all of the sessions that may be scheduled for the venue at each time point, such as during the hour of the event, whether or not those sessions may be active and already connected through the venue network to appropriate devices. Sessions may also be connected to the venue network as an input, with an assigned network slice, or may be on the schedule with no data having been transmitted to the network at the time of checking a venue schedule and network configuration. Each session may include a variety of data, primarily video and audio for a live speaker or pre-recorded multimedia clip but also possibly images in the form of a presentation or other supporting material or potentially text if online chat functions may be enabled and used for the session.

Some users may have pre-registered to attend a given session at a given time point, which may be the next hour. The number of such pre-registered users may then be applied to determine an a priori network resource level for that session at that time point. By considering all sessions scheduled to occur at the given time point along with the number of pre-registered users who wish to attend each such session, an allocation may be made between the session and a physical location in each venue and a network slice with appropriate capacity and beam direction to accommodate the planned content, number of users, and location, may be assigned. The process may repeat for all sessions and all time points. A new connection request may be received from a user to access one of the sessions that are known by the venue or scheduled to be available during the particular time slot, and an available device may then be determined. At this point, because there may be an understanding of the active network slices and the allocated sessions in the venue, the user can be directed to the location that is already connected to the user's desired session, e.g., a nearby hall that may already be broadcasting the session. When the number of such users increases beyond a threshold such that the user's device may not be able to directly access the session because of bandwidth concerns or a venue may have disabled streaming to individual devices, in which case an alternate device in a specific location may be added to the assigned network slice of the session and the user may be directed to that location.

Similarly, a new user may submit a request to attend a new session, at the same time point, for which a device and location have not yet been provisioned. If no new device and location is available, the content from the newly requested session may be directed to a location and device on which different session is already enabled. In this case, the device may be directed to split the monitor screen into two parts, each showing one of the two sessions, and audio muted with the audio text being converted to subtitles on the screen. The network slice may be increased to the device to accommodate the increased bandwidth required for streaming two sessions.

Whatever the available device may be, the venue network may be modified to accommodate the session at the available device. This may include modifications to physical network elements, such as beamforming in the case of antennae in wireless networks, or configuration of individual network hardware elements, or changes to wireless controller software, e.g., a radio-access network intelligent controller (RIC), to modify a network slice configuration that may allow routing of the session data to an appropriate device that is determined by the module 150.

Figure 2:
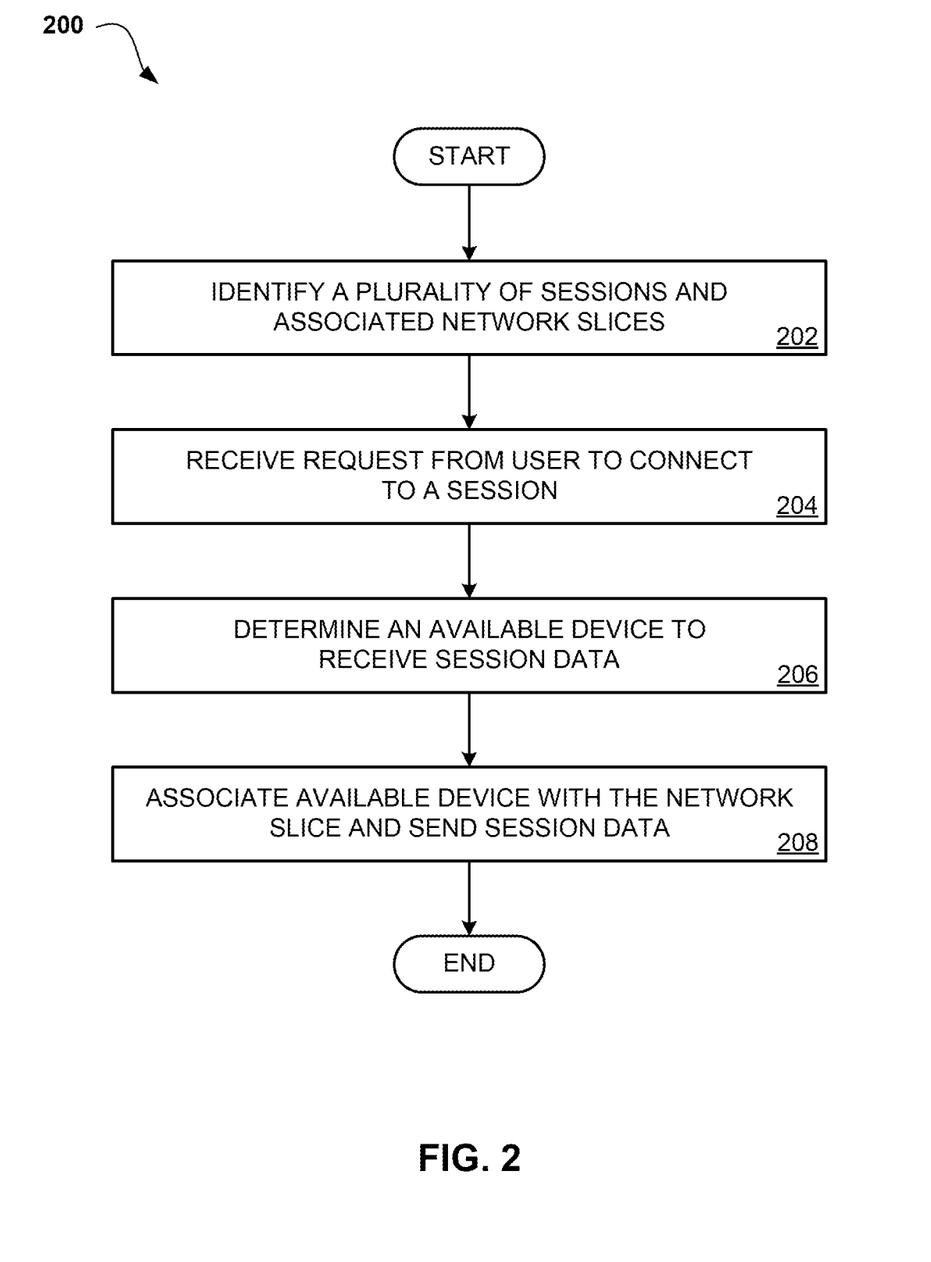
FIG. 2 depicts a flow chart diagram for a process that routes meeting session content in a venue based on device availability according to an embodiment.

Referring to FIG. 2, an operational flowchart illustrating a process 200 that routes meeting session content in a venue based on device availability is depicted according to at least one embodiment. At 202, conference sessions or meetings may be identified in a schedule for a venue and also a network configuration for the venue. The management or control of the venue network may use a concept known as network slicing, which is a form of virtualization that allows multiple logical networks to run on top of a shared physical network infrastructure. A distributed cloud network may share network resources with various slices to allow different users to multiplex over a single physical infrastructure. As an example, many devices may need to share a physical network which may be allocated into slices. Network slicing may allow the physical network to be partitioned at an end-to-end level to group traffic, isolate data traffic and configure network resources at a macro level. A network slice may implement many virtual components that may be created and moved based on current demands at particular locations and an orchestrator process may continually change locations of virtual components to ensure network performance of services across multiple slices. In the context of process 200, network slices may or may not already be assigned to carry the session data for each of the sessions or meetings.

The schedule may simply be the same as a text schedule for the conference that may be published with times and dates and locations of the sessions, along with specific speakers and topics, which an individual user may use to determine interest in the session. A venue schedule may also include information allowing registration in sessions of interest by attendees, where the indication of local attendees may also prompt the venue network controller, or administrator if the orchestration function is manual, to pre-configure a network slice to carry the session data. The venue schedule may include the ability to modify registration by an attendee, for example if an attendee may wish to leave one session to attend another. In this context, session data may include audio and video of a live speaker or pre-recorded presentation, images of a screen or other presentation, and text, e.g., a configured online chat room tied to the session. One of ordinary skill in the art may understand that a session or meeting may have many types of multimedia content available for broadcast over a venue network and the schedule or configuration at this stage to be accessed for information is only required to provide a mapping of potential session data to an existing network slice or that a slice may need to be created to provide the session data over the venue network. It should also be noted in this context that while the conference venue itself may be a conference center or an arena that may be intended for such meetings, the meeting may also instead be a class, such as a university lecture, where the venue may be a university campus. Any facility that may be equipped for hosting sessions or classes may be used.

A venue network as described herein may include equipment to capture session data, such as cameras or microphones or other devices connected to the network, along with appropriate software to control the devices, as well as individual network elements, in hardware or software, to connect the source of the session to the venue network. As such, a venue network may employ multiple applications deployed locally with multiple ingress and egress profiles. A session as described herein may be represented by the schedule and accompanying information described above to a user or other person but where the venue network may be involved, a session may be described by a network slice that may be assigned through any means by the controller or orchestrator for the venue network and also the session data to be transmitted over the network slice. The controller or orchestrator may manage the mapping of the representation of the session to users, which for example may be used in connection requests, to the information that may be known by the venue network.

It should also be understood that a network slice, as a virtual network that may be created by an administrator through a controller or orchestrator, may also have certain connection requirements in the network slice configuration to manage the impact of the network slice on the venue network. For example, a network slice may be limited in the number of devices that may be connected in order to manage the complexity of the network slice. Once the maximum is reached, then further configuration may be required to add devices to the network slice, e.g., a second network slice may need to be created to add further devices. These devices may also connect to the session but may be managed in a separate virtual network to ease management overhead. However, the settings may also be configured by an administrator to maintain flexibility in the management and control of the venue network. Another example of a connection requirement may be bandwidth needs of a slice or a session, where a cap may be placed on the amount of bandwidth available to a slice and therefore a limit on connections to devices.

As will also be mentioned below, the requirements of a network slice may include more specific aspects such as restrictions on the type of device or number of devices or number of users that may connect to the venue network. For instance, a venue may not allow any personal mobile devices to be associated with any network slice for the purpose of reducing complexity of physical connections within the network. There may also be physical limitations of network elements associated with network slices, such as restricted frequency ranges or directions of antennae in a wireless network, described more fully below with respect to spectrum zones.

At 204, a request may be received from a user to connect to a session. This request may be in the form of a communication through a website or any other vehicle that a venue may provide for users to make connection requests. The same venue website may be used by the attendees to indicate that the attendee wishes to ask a question, thereby not only watching the session but also transmitting audio only or audio with video back to the other attendees of the session at any venue. One of ordinary skill in the art may recognize that there are many ways for an entity to receive connection requests and it is only required for the venue network, via a controller or orchestrator, to receive an indication to access a session and possibly a device that a user wants to designate as an available device to the venue network and potentially connect as an available device through the network slice for the session.

Regarding the connection request, it should be noted that all collection of information from a source that may personally identify a user or is sensitive in any other way requires the informed consent of all people whose information may be collected and analyzed for the purposes described herein. Consent may be obtained in real time or through a prior waiver or other process that informs a subject that their information may be captured by a device or other process and that the information may be used to determine an available device for the requested session. The information owner is free to decide at any time to revoke consent for use of sensitive information as these settings are permanently retained to keep the venue network configuration module 150 updated with the latest information and also allow the owner of the information complete control over their informed consent to use sensitive information in the course of the session. The consent described here may also refer to allowing some, or any, data relating to an information owner's vehicle from being sent to a local server, cloud server or any other location. The owner has complete control on the transmission of information that may be sensitive or personally identify the owner of the information.

At 206, an available device may be found and determined to be suitable to connect to the session, e.g., that meets the connection requirements of the network slice, and receive the session data. A venue network may consist of physical elements in addition to the virtual networks, or network slices, that may have been established, including spectrum zones, which describe physical areas that may be covered by wireless signals that are broadcast into the physical area. For instance, an antenna may be placed in a room and the signal may cover the entire room. In this example, the room may be described as a spectrum zone and any devices that may be in the room may be an available device if they are not already associated with a network slice or receiving session data. In another example, a larger open space may be subdivided into multiple spectrum zones, where directional antennae may be placed and oriented such that different signals cover different portions of the space. In addition to orientation/direction and signal power level, the frequency of the wireless signal may also be adjusted to form a spectrum zone, such that two signals may occupy the same physical space but operate on different frequencies and would allow multiple network slices, or sessions, to be sent to available devices that may be configured for the separate frequency ranges. However, it should be noted that it is not required that devices, as described herein, be connected to a wireless signal or a spectrum zone. It is only required that devices are available to connect to a session via a network slice and the connection may be fixed through an appropriate wired connection as well. The network slice may be configured by an orchestrator or controller as a virtual network that runs over the physical connection.

In addition, the term "device", as used herein, may refer to an endpoint, e.g., end user device (EUD) 103, that may be used to connect to a session, such as a mobile device carried by a user or a monitor and speakers that are fixed in a physical location. However, one of ordinary skill in the art may recognize that a single monitor may have multiple video windows open and running, or "tiled", such that a single physical monitor may have the capability of connecting to multiple sessions, and therefore multiple network slices. In such an instance, each of the windows, or connections, may represent an available device and in addition to any connection requirements that may be in place for a network slice, there may be restrictions on the number of sessions that a monitor or other infrastructure may host. These restrictions may be known by the orchestrator or controller and factored into decisions about available devices for connection to sessions or network slices, where the requirements may be included in the connection requirements of the network slice.

In an embodiment, a supervised machine learning model may be trained to predict characteristics required for the allocation of network slices to devices. These characteristics may include a number of new users expected to attend each session during each time slot, the expected duration of streaming video into the device for passive viewing by the users, and the expected duration of streaming video out of the device, for example when users wish to ask questions to users in other locations. Based on the predicted characteristics of each session, a suitable spectrum zone, or location, and an appropriately sized device for the session may be determined and assigned to each session. One or more of the following machine learning algorithms may be used: logistic regression, naive Bayes, support vector machines, deep neural networks, random forest, decision tree, gradient-boosted tree, and multilayer perceptron. In an embodiment, an ensemble machine learning technique may be employed that uses multiple machine learning algorithms together to assure better prediction when compared with the prediction of a single machine learning algorithm. In this embodiment, training data for the model may include prior connection requests for the session data in the venue or from specific locations. For instance, the number of users who have pre-registered for each session and historical patterns on new unregistered users who register during a session, along with historical patterns of users leaving sessions, may be used to predict the likely number of users for each session at each time point.

In another example, a user location may be determined and a spectrum zone that is closest to that location may be determined, along with an available device. In addition to determining the available device, the model may also learn the impact that a connection may have on the venue network, specifically the network slices, and determine availability of devices based on this impact. For instance, it may be determined that only devices within a certain distance of an antenna or in a specific field of view from the antenna may form an appropriate spectrum zone that may have the needed bandwidth to connect and maintain the session data. In such a case, the model may rule out connection to certain devices that are not configured according to the requirements or recommend a re-configuration of relevant equipment to the orchestrator or controller when a connection request is received from a certain location or device. The training data may be collected from a single example user/request or a group of users/requests, with user consent required prior to collection of any data from human users, as mentioned above. The prediction results may be stored in a database so that the data is most current, and the output would always be up to date.

At 208, the available device may be associated with the network slice along with the session, such that the session data may be transmitted to the available device and the user may access the session through the available device. The association of the available device to the network slice may be maintained within the venue network configuration for use in the machine learning models described above and may include modification of the venue network to accommodate the association and allow the session data to flow to the available device. For instance, there may be multiple network elements in the path to the available device that may be configured to complete the association. The modification of the venue network may include changes to the physical network elements, including the direction and power levels of the antennae in wireless networks.

Additionally, once a connection to a session has been made, the bandwidth of the session data on the network slice may be monitored and controlled, along with the overall bandwidth profile of the venue network. An event, whether scheduled or not scheduled, may be identified in the course of a session that may require additional bandwidth to be allocated to the network slice or physical portion of a network slice. For instance, if a user in a remote location were to participate in a question and answer (Q&A) session related to a session, then additional bandwidth may be required between an available device and the remainder of the network such that the user has an audio or video connection to ask a question and be heard by other users in the session, including the presenter. This bandwidth requirement may be expressed in the form of a consumption level, which may be calculated as a ratio of the session bandwidth to the network slice bandwidth and determining that more bandwidth is needed may be accomplished by establishing a consumption threshold. Action may then be taken when the consumption level rises above the threshold, such as by increasing the bandwidth of the network slice for that session for the predicted duration of the question. It should be noted that the monitoring and adjustment of bandwidth may be dynamic, such that resources may be directed to the network slice on demand and directed to other network slices when the resources are needed elsewhere. It is not required for the orchestrator or controller to have knowledge before the event that an event will take place, but it is possible that a session schedule may be known such that bandwidth needs of network slices may be predicted and managed throughout the time dedicated to each session.

Optionally at this stage, a notification response may be transmitted to the user that indicates the available device, which may include an existing or new device, as described above. The purpose of the notification response may be to alert or notify the users of a location that may be used to access the session. The available device may be a monitor and speakers set up within the venue or in one of the remote locations described above and may further include a mobile device belonging to the user in the event depending on the determination of 206. One of ordinary skill in the art may understand that it is not required that the notification response take a specific form, but rather the notification response should inform the user of the available device and a possible need to move into a specific location to access the session. The alert or notification that may be transmitted may be a text message and may include a vibration or audible sound that alerts or notifies the user that made a connection request for a session or meeting that an appropriate device for connection to the session may be found in a specific location, which may further require the user to move to that location.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for routing conference session content through a venue based on device availability, the method comprising:

receiving a device allocation request for a conference session, wherein the conference session comprises session data;

obtaining historical session information from a server and determining a user activity pattern for the conference session from the historical session information;

identifying a network slice associated with the session data of the conference session in a venue network, wherein the network slice includes connection requirements;

determining an available device of one or more available devices for the device allocation request based on the connection requirements of the network slice and the user activity pattern for the conference session; and connecting the available device to the network slice such that the session data is transmitted to the available device.

2. The computer-implemented method of claim 1, further comprising transmitting a notification response to a user indicating the available device.

3. The computer-implemented method of claim 1, further comprising:

monitoring session bandwidth of the session data being transmitted to the available device and network slice bandwidth;

identifying an event during the conference session that increases a consumption level of the network slice above a consumption threshold, wherein the consumption level is a ratio of the session bandwidth to the network slice bandwidth; and adjusting the network slice bandwidth such that the consumption level of the network slice is below the consumption threshold during the event.

4. The computer-implemented method of claim 1, wherein the determining the available device to receive the session data further comprises:

determining a user location based on the device allocation request;

selecting a spectrum zone in the venue network based on the user location and the connection requirements of the network slice; and identifying a device in a selected spectrum zone, wherein the device is not associated with any network slice and satisfies the connection requirements of the network slice.

5. The computer-implemented method of claim 1, wherein a machine learning model that predicts a bandwidth impact to a network connection by adding a device to the network connection is used to determine the available device.

6. The computer-implemented method of claim 1, wherein the session data is selected from a group consisting of: audio data, text data, and image data.

7. The computer-implemented method of claim 1, wherein the connection requirements of the network slice are selected from a group consisting of: a number of users, a number of connected devices, an available range of the network slice bandwidth, device types, and physical restrictions on network elements.

8. A computer system for routing conference session content through a venue based on device availability, comprising:

one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:
receiving a device allocation request for a conference session, wherein the conference session comprises session data;
obtaining historical session connection information from a server and determining a user activity pattern for the conference session from the historical session connection information;
identifying a network slice associated with the session data of the conference session in a venue network, wherein the network slice includes connection requirements;
determining an available device of one or more available devices for the device allocation request based on the connection requirements of the network slice and the user activity pattern for the conference session; and
connecting the available device to the network slice such that the session data is transmitted to the available device.

9. The computer system of claim 8, further comprising transmitting a notification response to a user indicating the available device.

10. The computer system of claim 8, further comprising:
monitoring session bandwidth of the session data being transmitted to the available device and network slice bandwidth;
identifying an event during the conference session that increases a consumption level of the network slice above a consumption threshold, wherein the consumption level is a ratio of the session bandwidth to the network slice bandwidth; and
adjusting the network slice bandwidth such that the consumption level of the network slice is below the consumption threshold during the event.

11. The computer system of claim 8, wherein the determining the available device to receive the session data further comprises:
determining a user location based on the device allocation request;
selecting a spectrum zone in the venue network based on the user location and the connection requirements of the network slice; and
identifying a device in a selected spectrum zone, wherein the device is not associated with any network slice and satisfies the connection requirements of the network slice.

12. The computer system of claim 8, wherein a machine learning model that predicts a bandwidth impact to a network connection by adding a device to the network connection is used to determine the available device.

13. The computer system of claim 8, wherein the session data is selected from a group consisting of: audio data, text data, and image data.

14. The computer system of claim 8, wherein the connection requirements of the network slice are selected from a group consisting of: a number of users, a number of connected devices, an available range of the network slice bandwidth, device types, and physical restrictions on network elements.

15. A computer program product for routing conference session content through a venue based on device availability, comprising:
a computer readable storage medium having program instructions embodied therewith, the program instructions executable by a processor to cause the processor to perform a method comprising:
receiving a device allocation request for a conference session, wherein the conference session comprises session data;
obtaining historical session connection information from a server and determining a user activity pattern for the conference session from the historical session connection information;
identifying a network slice associated with the session data of the conference session in a venue network, wherein the network slice includes connection requirements;
determining an available device of one or more available devices for the device allocation request based on the connection requirements of the network slice and the user activity pattern for the conference session; and
connecting the available device to the network slice such that the session data is transmitted to the available device.

16. The computer program product of claim 15, further comprising transmitting a notification response to a user indicating the available device.

17. The computer program product of claim 15, further comprising:
monitoring session bandwidth of the session data being transmitted to the available device and network slice bandwidth;
identifying an event during the conference session that increases a consumption level of the network slice above a consumption threshold, wherein the consumption level is a ratio of the session bandwidth to the network slice bandwidth; and
adjusting the network slice bandwidth such that the consumption level of the network slice is below the consumption threshold during the event.

18. The computer program product of claim 15, wherein the determining the available device to receive the session data further comprises:
determining a user location based on the device allocation request;
selecting a spectrum zone in the venue network based on the user location and the connection requirements of the network slice; and
identifying a device in a selected spectrum zone, wherein the device is not associated with any network slice and satisfies the connection requirements of the network slice.

19. The computer program product of claim 15, wherein a machine learning model that predicts a bandwidth impact to a network connection by adding a device to the network connection is used to determine the available device.

20. The computer program product of claim 15, wherein the session data is selected from a group consisting of: audio data, text data, and image data.

* * * * *